United States Patent
Jayarathne et al.

(10) Patent No.: US 12,270,558 B2
(45) Date of Patent: *Apr. 8, 2025

(54) SYSTEM AND METHOD FOR FAULTING TO RETURN AIR SENSOR

(71) Applicant: Tyco Fire & Security GmbH, Neuhausen am Rheinfall (CH)

(72) Inventors: Madhuka Manuranga Jayarathne, Wichita, KS (US); Thomas D. Chase, Rose Hill, KS (US); Theresa N. Gillette, Wichita, KS (US); Andrew Michael Boyd, Wichita, KS (US)

(73) Assignee: Johnson Controls Light Commercial IP GmbH, Neuhausen am Rheinfall (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/369,590

(22) Filed: Sep. 18, 2023

(65) Prior Publication Data

US 2024/0003567 A1 Jan. 4, 2024

Related U.S. Application Data

(63) Continuation of application No. 16/591,214, filed on Oct. 2, 2019, now Pat. No. 11,761,656.

(60) Provisional application No. 62/817,827, filed on Mar. 13, 2019.

(51) Int. Cl.
*F24F 11/00* (2018.01)
*B01D 46/00* (2022.01)
*F24F 11/39* (2018.01)
*F24F 110/10* (2018.01)

(52) U.S. Cl.
CPC .......... *F24F 11/39* (2018.01); *B01D 46/0086* (2013.01); *F24F 2110/10* (2018.01)

(58) Field of Classification Search
None
See application file for complete search history.

(56) References Cited

U.S. PATENT DOCUMENTS

| 5,801,940 | A | 9/1998 | Russ et al. | |
| 11,761,656 | B2 * | 9/2023 | Jayarathne | F24F 11/38 700/267 |
| 2010/0006660 | A1 | 1/2010 | Leen et al. | |
| 2011/0002241 | A1 | 1/2011 | Phan | |
| 2013/0186613 | A1 | 7/2013 | Estiban | |
| 2017/0356669 | A1 | 12/2017 | Gonia et al. | |

(Continued)

*Primary Examiner* — Paul B Yanchus, III
(74) *Attorney, Agent, or Firm* — Fletcher Yoder, P.C.

(57) ABSTRACT

A system faults to a return air sensor integrated within a heating, ventilation, and air conditioning (HVAC) unit. The system transmits a signal to a remote sensor. The system determines that a return signal is not received from the remote sensor. The system obtains a temperature reading from the return air sensor. The system determines whether the temperature reading satisfies a temperature setting stored in the memory. In response to determining that the temperature reading does not satisfy the temperature setting, the system enables heating or cooling of the HVAC unit until the temperature setting is satisfied. In response to determining that the temperature reading satisfies the temperature setting, the system disables heating or cooling of the HVAC unit.

20 Claims, 4 Drawing Sheets

(56) References Cited

U.S. PATENT DOCUMENTS

| | | |
|---|---|---|
| 2019/0032980 A1 | 1/2019 | Nakayama et al. |
| 2020/0187336 A1 | 6/2020 | Verberkt et al. |

* cited by examiner

SYSTEM AND METHOD FOR FAULTING TO RETURN AIR SENSOR

CROSS REFERENCE TO RELATED APPLICATION(S)

This application is a continuation of U.S. patent application Ser. No. 16/591,214, entitled "SYSTEM AND METHOD FOR FAULTING TO RETURN AIR SENSOR," filed Oct. 2, 2019, which claims priority from and the benefit of U.S. Provisional Application No. 62/817,827, entitled "SYSTEM AND METHOD FOR FAULTING TO RETURN AIR SENSOR," filed Mar. 13, 2019, each of which is hereby incorporated by reference in its entirety for all purposes.

FIELD

The present disclosure generally relates to control of heating, ventilation, and air conditioning (HVAC) systems, and more specifically to systems and methods for faulting to a return air temperature sensor.

BACKGROUND

Generally, HVAC systems rely on network connectivity and wireless or wired sensors to operate without a formal thermostat. Thus, an HVAC system can power up and power down based on readings from the sensors and user defined setpoint information for a temperature and/or a humidity level. Users can program setpoint information on their mobile devices via a user interface in many advanced HVAC systems. However, in some cases, the remote sensor may fail or the HVAC system may be unable to communicate with the sensor.

In this situation, the HVAC system must still continue to heat or cool the building (e.g., a house), but cannot operate without base information regarding the current conditions inside a particular building. In prior configurations, a thermostat provided conditioning information and allowed users to identify a setpoint. Furthermore, conventional thermostats were typically wired, so lost connections were rather uncommon. However, with the elimination of a thermostat, when network connectivity is lost, or communication with the remote sensors are lost, the HVAC system cannot function properly.

Therefore, there is a need for systems and methods that allow uninterrupted heating or cooling even in the event that one or more sensors within a building are unavailable.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides temperature control systems, apparatuses, and methods.

In an aspect, a system for faulting to a return air sensor associated with a heating, ventilation, and air conditioning (HVAC) unit. The system includes a remote sensor and a controller configured to communicatively couple to the remote sensor. The controller is further configured to determine, via a processing system of the controller, whether a communication link configured to enable the HVAC unit to communicatively couple to the remote sensor is available. In response to determining that the communication link is unavailable, the controller is configured to receive, via the processing system, an ambient condition reading from the return air sensor, compare, via the processing system, the ambient condition reading to an ambient condition setting, and in response to the ambient condition reading not being within a threshold amount of the ambient condition setting, operate, via the processing system, the HVAC unit using the ambient condition reading.

In another aspect, a heating, ventilation, and air conditioning (HVAC) system includes an HVAC unit configured to adjust an ambient condition of a building, a return air sensor, a remote sensor disposed within the building, wherein the remote sensor is not associated with a thermostat, and a controller communicatively coupled to the return air sensor and the remote sensor. The controller comprises instructions that, when executed by a processing system, cause the processing system to transmit a signal to the remote sensor, in response to an absence of a return signal from the remote sensor and the HVAC unit being in an off cycle for a predetermined amount of time, operate the HVAC unit to circulate air into the building, receive an ambient condition reading from the return air sensor after operating the HVAC unit to circulate air into the building, and compare the ambient condition reading to an ambient condition setting. Moreover, in response to the ambient condition reading not being within a threshold amount of the ambient condition setting, the processing system is configured to enable heating or cooling of the HVAC unit until the ambient condition reading is within the threshold amount of the ambient condition setting.

In a further aspect, a non-transitory computer-readable medium is provided. The non-transitory computer-readable medium stores instructions that, when executed by a processing system, cause the processing system to determine whether a network configured to enable an HVAC unit to communicatively couple to a remote sensor is available, wherein the remote sensor is independent of a thermostat. Furthermore, in response to determining that the network is unavailable, the instructions, when executed by the processing system, cause the processing system to receive a temperature reading from a return air sensor associated with the HVAC unit, wherein the temperature reading is configured to indicate a first temperature associated with air inside of the HVAC unit, receive an outside temperature reading, wherein the outside temperature reading is configured to indicate a second temperature associated with air outside of the HVAC unit, and offset the temperature reading from the return air sensor based on the outside temperature reading to provide an offset temperature reading. Moreover, the instructions, when executed by the processing system, cause the processing system to compare the offset temperature reading to a temperature setting, wherein the temperature setting is stored in a memory associated with the processing system, and in response to the offset temperature reading not being within a threshold amount of the temperature setting, operate the HVAC unit using the offset temperature reading.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
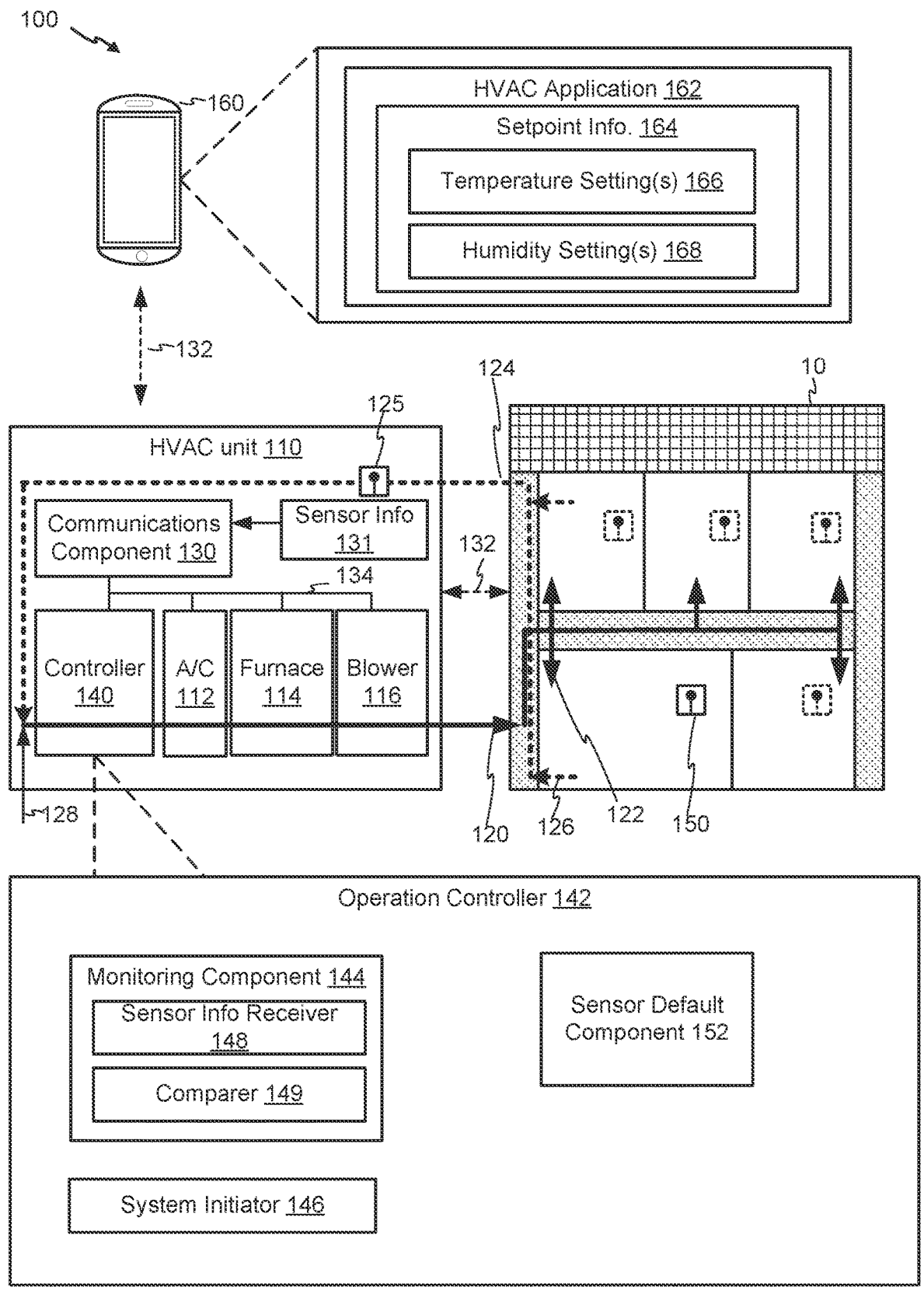
FIG. 1 is a block diagram of an example of an HVAC system according to aspects of the present disclosure.

Various aspects of the disclosure are now described with reference to the drawings, wherein like reference numerals are used to refer to like elements throughout. In the following description, for purposes of explanation, numerous specific details are set forth in order to promote a thorough understanding of one or more aspects of the disclosure. It may be evident in some or all instances, however, that any aspects described below can be practiced without adopting the specific design details described below. In other instances, well-known structures and devices are shown in block diagram form in order to facilitate description of one or more aspects. The following presents a simplified summary of one or more aspects of the disclosure in order to provide a basic understanding thereof.

Referring to FIG. 1, an HVAC system 100 for a building 10 is disclosed. The HVAC system 100 may include an HVAC unit 110 configured to control an ambient condition of the one or more rooms of the building 10 based on information from one or more sensors 150 and a remote user device 160. In an example, an ambient condition may be a temperature or a humidity level. As shown by FIG. 1, the HVAC unit 110 may be external to the building 10. In an aspect, one or more components (e.g., air conditioning (A/C) unit 112, furnace 114, blower 116, communications component 130, or controller 140) may be located in different locations including inside the building 10. The building may be a home, office or any other structure that includes uses an HVAC system for controlling one or more ambient conditions of the structure.

In an aspect, the HVAC system 100 may include supply ducts 120 and return ducts 124 installed within the building 10 and coupled with the HVAC unit 110. The supply ducts 120 may supply air to the building 10, and the return ducts 124 may return air from the building 10. The supply ducts 120 may receive supply air through one or more of intakes 128 that provide outside air to the HVAC system 100 and/or may recycle return air from the return ducts 124. The supply ducts 120 may output the supply air at one or more of the rooms of the building 10 via one or more supply vents 122. The return ducts 124 may receive return air from the building 10 via the return ducts 124 to balance air within the building 10. The return air may be input into the return ducts 124 via one or more return vents 126. In one aspect, one or more return air sensor(s) 125 may be located within the return air duct 124, external to the building 10, though in some configurations, the one or more return air sensor(s) 125 may be located in the building 10 within the return air duct 124 also. In FIG. 1, the return air sensor 125 is integrated within the HVAC unit 110, e.g., is located inside the return ducts 124 within the HVAC unit 110, but alternative locations are also contemplated herein. The return air sensor 125 measures the temperature or other settings such as humidity or the like of the air returning from the building 10 through the return duct 124.

The HVAC unit 110 may include one or more of an A/C unit 112, a furnace 114, a blower 116, a humidifier/dehumidifier 118, or any other component (e.g., heat pump, not shown) for adjusting an ambient condition of a room of the building 10. The A/C unit 112 may be configured to cool the supply air by passing the supply air through or around one or more cooled pipes (e.g., chiller pipes) to lower a temperature of the supply air. The furnace 114 may be configured to warm the supply air by passing the supply air through or around one or more warmed pipes (e.g., heating coils) to raise a temperature of the supply air. The blower 116 may be configured to blow the supply air through the supply ducts 120 to the building 10 and pull the return air from the building 10.

The HVAC unit 110 may also include a communications component 130 configured to communicate with the one or more sensors 150 and/or the remote user device 160. In an aspect, the communications component 130 may communicate with the one or more sensors 150 and/or the remote user device 160 via one or more communications links 132. In an example, the communications component 130 may include one or more antennas, processors, modems, radio frequency components, and/or circuitry for communicating with the sensor 150 and/or the remote user device 160. The one or more communications links 132 may be wired or wireless communication links.

The HVAC system 100 may also include the one or more sensors 150 located within one or more rooms of the building 10 and/or within or near the supply vents 122. One or more sensors 150 may be configured to detect an ambient condition such as a temperature or a humidity level of the room where the sensor 150 is located, or even occupancy of the room (using, e.g., optical beam interruption for recognizing movement or the like). Each of the sensors 150 may provide sensor information 131 to the HVAC unit 110. Examples of a sensor 150 may include a temperature sensor, a humidity sensor, or any sensor configured to detect an ambient condition of one or more rooms of the building 10.

The HVAC system 100 may also include the remote user device 160 configured to communicate with the HVAC unit 110. The remote user device 180 may include an HVAC application 162 configured to display, adjust, and store setpoint information ("info") 164 indicating desired user settings for one or more rooms of the building 10. In an example, the setpoint information 164 may include temperature settings 166 indicating one or more desired temperatures (e.g., minimum and/or maximum room temperatures) for one or more rooms of the building and/or humidity settings 188 indicating a desired humidity level for one or more rooms of the building 10. The remote user device 160 may provide the setpoint information 164 to the HVAC unit 110. Examples of a remote user device 160 may include a mobile device, a cellular phone, a smart phone, a personal digital assistant (PDA), a smart speaker, a home assistant, a wireless modem, a wireless communication device, a handheld device, a tablet computer, a laptop computer, a cordless phone, a smart watch, an entertainment device, an Internet of Things (IoT) device, or any device capable of communicating with the HVAC unit 110. A smart speaker may include, for example, an Echo® device available from Amazon, Inc. of Seattle, Washington, a Google Home® device available from Google, Inc. of Mountain View, California, or other similar devices. The HVAC application 162 may include a voice interface that response to voice commands.

The HVAC unit 110 may also include a controller 140 configured to control the A/C unit 112, the furnace 114, and the blower 116 based on the sensor information 131 received from the one or more sensors 150 and the setpoint information 164 received from the remote user device 160. The controller may communicate with the communications component 130, the A/C unit 112, the furnace 114, and/or the blower 116 via a communications bus 134. The controller 140 may include logic to determine when to initiate the blower 116 along with one of the A/C unit 112 or the furnace 114 based on the sensor information 131 and the setpoint information 164. The controller 140 may also include logic to determine a time and/or a speed to run the blower 116 along with a time or power level to run one of the A/C unit 112 or the furnace 114 based on the sensor information 131 and the setpoint information 164.

The controller 140 may further comprise an operation control component 142 to perform the logic of the controller 140, the operation control component 142 comprising a monitoring component 144, a system initiator 146 and a sensor default component 152. The controller 140, in some instances, may be unable to communicate with the one or more remote sensor(s) 150. In this case, in order to continue uninterrupted operation of the HVAC unit 110, the controller 140 may rely on the sensor default component 152, a component of the operation control component 142 to default to reading temperatures from the return air sensor 125 for temperature and/or humidity readings. The sensor default component 152 determines whether a return signal is received from the one or more remote sensors 150, using for example, the monitoring component 144 that receives readings via the sensor information ("info") receiver 148.

In some aspects, the controller 140 waits a predetermined period of time (e.g., approximately thirty seconds to one minute) with no communication prior to using the return air sensor 125 for temperature readings. In some aspects, the sensor default component 152 may flag the absence of a return signal from the one or more remote sensors 150 and issue a warning to a user of the HVAC unit 110 that communication is lost with the one or more remote sensors 150. The warning may be issued on a user interface 304 (shown in FIG. 3) associated with the HVAC unit, and/or sent as an alert to the user's mobile device(s) 160, using the communications component 130. Additionally, the warning may be displayed on the external warning indicator 302 (shown in FIG. 3) of the HVAC unit 110. In some aspects of the present disclosure, the warning or alert may be an email, text message or any other type of notification, for example a notification associated with an HVAC application 162 on the mobile device(s) 160.

In some aspects, the sensor default component 152 may use a comparer 149 to compare a reading obtained from the return air sensor 125 with the setpoint information 164. If the reading from the return air sensor 125 does not satisfy the temperature settings 166, the system initiator 146 will start or stop one or more components of the HVAC unit 110, e.g., the furnace 114, the A/C 112, the blower 116, etc., until the conditions specified in the temperature settings 166 are satisfied. If the reading from the return air sensor 125 is equal to or within the minimum and maximum temperature specified in the settings 166, the sensor default component 152 does not initiate the blower 116.

In one non-limiting aspect, for example, when the HVAC unit 110 is configured/set for providing heating functionality (e.g., during winter), if the reading from the return air sensor 125 is less than a corresponding minimum temperature setting specified in the temperature settings 166, the system initiator 146 may start the furnace 114 and the blower 116 to circulate heated air into the building 10 to reduce the reading returned from the return air sensor 125 to meet the temperature settings 166. For example, in an aspect, the system initiator 146 may operate the furnace 114 and the blower 116 until the reading from the return air sensor 125 is greater than or equal to a corresponding maximum temperature setting specified in the temperature settings 166.

In another non-limiting aspect, for example, when the HVAC unit 110 is configured/set for providing cooling functionality (e.g., during summer), if the reading from the return air sensor 125 is greater than a corresponding maximum temperature specified in the temperature settings 166, the system initiator 146 may start the A/C 112 and the blower 116 to circulate cooled air into the building 10 to reduce the reading returned from the return air sensor 125 to meet the temperature settings 166. For example, in an aspect, the system initiator 146 may operate the A/C 112 and the blower 116 until the reading from the return air sensor 125 is less than or equal to a corresponding minimum temperature setting specified in the temperature settings 166.

Figure 3:
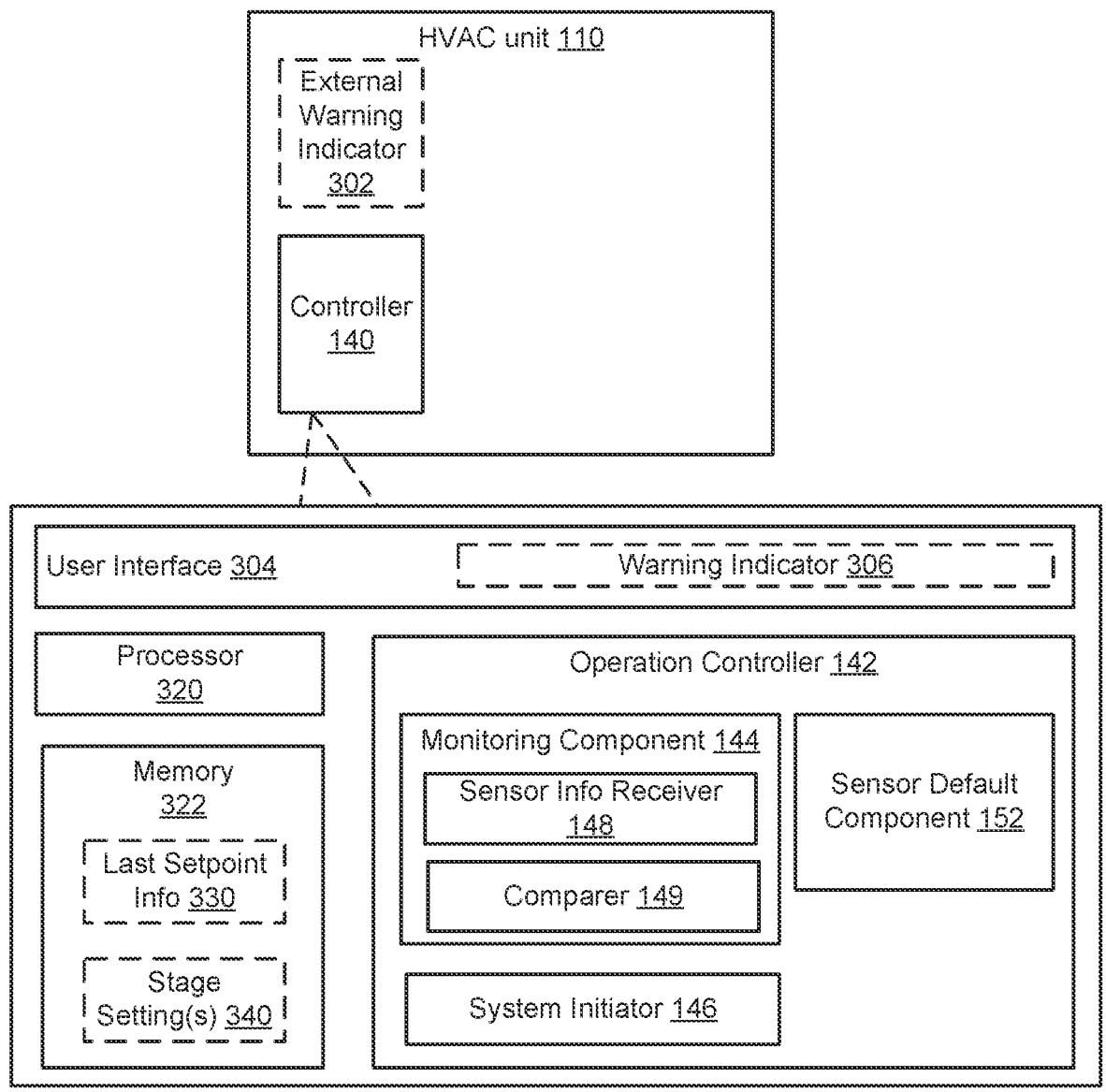
FIG. 3 is a block diagram of an example controller according to aspects of the present disclosure.
Figure 4:
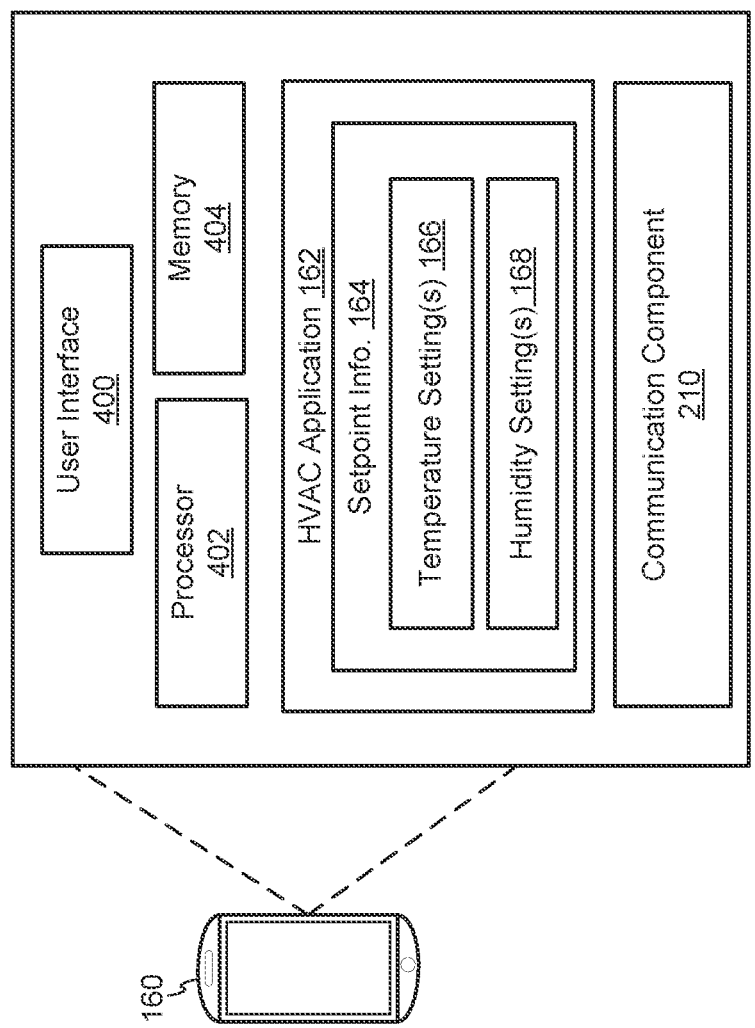
FIG. 4 is a block diagram of an example mobile device according to aspects of the present disclosure.

FIG. 3 shows further detail regarding the controller 140, including a user interface 304 along with a warning indicator 306 that is enabled when the monitoring component 144 determines that communication with the remote sensor(s) 150 is unavailable. Further, FIG. 3 illustrates that the controller 140 may include a processor 320 and memory 322, the memory 322 storing, for example, last setpoint information 330 in case network communication is lost along with stage setting(s) 340 that control various stages of operation of the HVAC unit 110 if it is a multi-stage unit. Further detail regarding the implementation of controller 140 is shown in FIG. 5.

Figure 2:
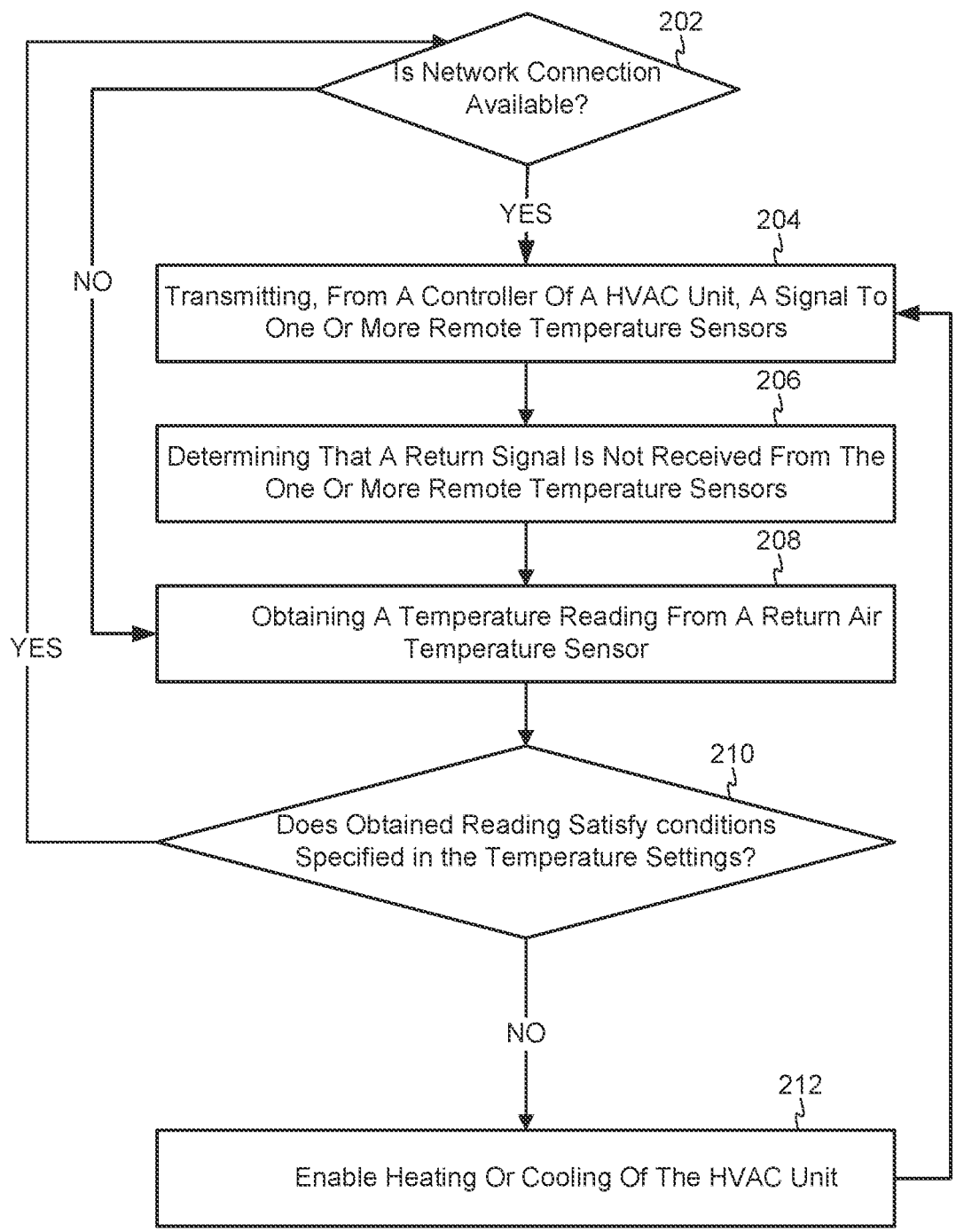
FIG. 2 is a flow diagram for an example method of defaulting to a return air temperature sensor, according to aspects of the present disclosure.

FIG. 2 is a flow diagram for a method 200 for defaulting to a return air sensor by the HVAC unit 110, where the return air sensor is integrated within the HVAC unit 110, in accordance with some aspects of the present disclosure. The method 200 may implement the functionality described herein with reference to FIG. 1 and may be performed by one or more components of the HVAC unit 110 as described herein with reference FIGS. 1 and 3.

The method 200 begins at 202, where the method 200 may include determining whether a network connection is available to the network the HVAC unit 110 may connect to. If the connection is available, the method 200 proceeds to 204. However, if it is detected that the connection is unavailable, the method 200 proceeds to 208, described below, where the return air sensor is used to control the HVAC unit. For example, one or more components (e.g., controller 140, processor 320, operation controller 142 or monitoring component 144) of the HVAC unit 110 may determine whether the network connection is available or unavailable.

At 204, the method 200 may also include transmitting a signal to one or more of the remote sensors 150. For example, one or more components (e.g., controller 140, processor 320, operation controller 142 or monitoring component 144) of the HVAC unit 110 may transmit the signal to one or more remote sensors 150.

At 206, the method 200 may also include determining that a return signal is not received from the one or more remote sensors 150. For example, one or more components (e.g., controller 140, processor 320, operation controller 142 or monitoring component 144) of the HVAC unit 110 may determine that the return signal is not received. In some aspects, the component waits a predetermined period of time (e.g., thirty seconds to one minute, though this is configurable or preset) prior to continuing with method 200. In some aspects, the component may flag the absence of a return signal from the one or more remote sensors 150 and issue a warning to a user of the HVAC unit 110 that communication is lost with the one or more remote sensors 150. The warning may be issued on a user interface 304 associated with the HVAC unit, and/or sent as a notification to the user's mobile device(s) 160. Additionally, the warning may be displayed on the external warning indicator 302 of the HVAC unit 110. In some aspects of the present disclosure, the warning may be an email, text message or any other type of notification, for example a notification associated with an HVAC application 162 on the mobile device(s) 160.

At 208, the method 200 may also include obtaining a temperature reading from a return air temperature sensor (e.g., return air sensor 125 integrated within the HVAC unit 110 as shown in FIG. 1) as a value representative of the temperature inside the house. For example, one or more components (e.g., controller 140, processor 320, operation controller 142 or monitoring component 144) of the HVAC unit 110 may obtain the temperature reading from the return air sensor 125. In some aspects, a significant amount of time may have passed since the blower 116 of the HVAC unit 110 has been off. Therefore readings from the return air sensor 125 may not be fully representative of the air temperature inside the building 10. Further, the return air sensor 125 may be located external to the building 10 and may be influenced by external temperatures. Therefore, in this aspect, prior to obtaining a reading from the return air sensor 125, the component may determine that the HVAC unit 110 is in an off cycle (e.g., the blower 116 is off) for a predetermined period of time and enable one or more fans of the blower 116 of the HVAC unit 110 to circulate air from the respect unit into the building 10 by powering up the blower 116. In some aspects, the air may be recirculated for a predetermined period of time. Then, when several cycles of air have flowed in and returned to the HVAC unit 110 via the return air duct 124 (i.e., circulated) or a predetermined amount of time has passed (e.g., five minutes), readings from the return air sensor 125 may be significantly more representative of temperatures inside the building Thus, after the air circulates for several cycles, the component may then obtain a temperature reading from the return air sensor 125 before continuing with the method 200.

At 210, the method 200 may also include determining whether the obtained readings satisfy a temperature setting specified in the last setpoint information 330 stored in the memory 322 of the controller 140. For example, one or more components (e.g., controller 140, processor 320, operation controller 142 or monitoring component 144) of the HVAC unit 110 may compare the obtained temperature with a last setpoint information 330 stored in the controller 140. In some aspects, the temperature outside of the house may be significantly different than the temperature inside of the house and may affect the return air sensor 125 that is generally also located outside the building 10 within the return air duct 124 near the HVAC unit 110. In this instance, it may be advantageous to, prior to comparing the obtained temperature, obtain ambient temperature information if it is available. For example, ambient temperature information may be obtained by ambient air temperature sensors (not shown) located outside the HVAC unit 110 or elsewhere outside the building 10. In other aspects, external temperature information may be obtained through the Internet through a weather service or the like. Once the external temperature is received, the reading obtained from the return air sensor 125 may be offset by the external temperature reading.

If at 210, the reading from the return air sensor 125 is equal to or within the minimum and maximum temperatures specified in the temperature settings 166, the sensor default component 152 does not initiate the blower 116 and the method 200 returns to 202. However, in response to determining that the obtained reading does not satisfy the conditions specified in the temperature settings 166, the method 200 proceeds to 212.

At 212, the method 200 may also include enabling heating or cooling of the HVAC unit 110. For example, one or more components (e.g., controller 140, processor 320, operation controller 142 or monitoring component 144) of the HVAC unit 110 may enable the heating or cooling of the HVAC unit 110, as described above with reference to FIG. 1. For example, in one non-limiting aspect, when the HVAC unit 110 is configured/set for providing heating functionality (e.g., during winter), if the reading from the return air sensor 125 is less than a corresponding minimum temperature setting specified in the temperature settings 166, the system initiator 146 may start the furnace 114 and the blower 116 to circulate heated air into the building 10 until the reading returned from the return air sensor 125 meets the temperature settings 166. For example, in an aspect, the system initiator 146 may operate the furnace 114 and the blower 116 until the reading from the return air sensor 125 is greater than or equal to a corresponding maximum temperature setting specified in the temperature settings 166. In another non-limiting aspect, for example, when the HVAC unit 110 is configured/set for providing cooling functionality (e.g., during summer), if the reading from the return air sensor 125 is greater than a corresponding maximum temperature setting specified in the temperature settings 166, the system initiator 146 may start the A/C 112 and the blower 116 to circulate cooled air into the building 10 until the reading returned from the return air sensor 125 meets the temperature settings 166. For example, in an aspect, the system initiator 146 may operate the A/C 112 and the blower 116 until the reading from the return air sensor 125 is less than or equal to a corresponding minimum temperature setting specified in the temperature settings 166.

Once the reading from the return sensor 125 comes within a particular threshold value of the temperature settings 166, the method 200 may return to 202, operating periodically until return signals are received.

Though not shown in FIG. 3, after the setpoint in the setpoint information 164 is reached, the controller 140 may continuously detect whether communications with the one or more remote sensors 150 have resumed. If communications have resumed, the HVAC unit 110 operates according to readings from the one or more remote sensors 150 instead of the return air sensor 125. Alternatively, if all of the one or more remote sensors 150 are still unavailable, the method 200 restarts at 202. In some aspects, the controller 140 faults to the return air temperature sensor when a predetermined threshold number (e.g., 50%, or according to a desired configuration) of remote sensors 150 is unavailable.

By way of example, an element, or any portion of an element, or any combination of elements (e.g., the controller 142 or other components of the HVAC system 100) may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

The invention claimed is:

1. A system for faulting to a return air sensor associated with a heating, ventilation, and air conditioning (HVAC) unit, the system comprising:
   a remote sensor; and
   a controller configured to communicatively couple to the remote sensor, wherein the controller is configured to:
   determine, via a processing system of the controller, whether a communication link configured to communicatively couple the HVAC unit to the remote sensor is available;
   in response to a first determination that the communication link is unavailable, receive, via the processing system, an ambient condition reading from the return air sensor, wherein the ambient condition reading is indicative of an ambient condition within a building;
   compare, via the processing system, the ambient condition reading to an ambient condition setting; and
   in response to a second determination that the ambient condition reading is not within a threshold amount of the ambient condition setting, operate, via the processing system, the HVAC unit based on the ambient condition reading.

2. The system of claim 1, wherein, in response to the second determination that the ambient condition reading is not within the threshold amount of the ambient condition setting, the controller is configured to operate the HVAC unit to provide heating or cooling until the ambient condition reading is within the threshold amount of the ambient condition setting.

3. The system of claim 2, wherein the controller is configured to suspend heating or cooling operation of the HVAC unit in response to a third determination that the ambient condition reading is within the threshold amount of the ambient condition setting.

4. The system of claim 1, wherein the communication link comprises a wireless communication network.

5. The system of claim 1, wherein the controller is configured to receive the ambient condition setting from a wireless communication device.

6. The system of claim 5, wherein the controller comprises a memory, and wherein the controller is configured to store the ambient condition setting in the memory.

7. The system of claim 1, wherein the ambient condition setting comprises a temperature setting, a humidity setting, or both, associated with air within the building that is configured to be conditioned by the HVAC unit.

8. The system of claim 1, wherein the controller is further configured to:
   determine, via the processing system, that the HVAC unit is in an off cycle for a first predetermined period of time;
   operate, via the processing system, a blower of the HVAC unit to circulate air through the building; and
   receive, via the processing system, the ambient condition reading after initiating operation of the blower.

9. The system of claim 8, wherein the controller is configured to operate, via the processing system, the blower to circulate the air through the building for a second predetermined period of time or a predetermined number of cycles.

10. The system of claim 1, wherein the controller is further configured to:
    in response to a third determination that the communication link is available, transmit, via the processing system, a signal to the remote sensor; and
    display, via a user interface, a warning indicative of loss of communication with the remote sensor in response to an absence of a return signal from the remote sensor.

11. The system of claim 1, wherein the controller is configured to:
    in response to a third determination that the communication link is available, receive, via the processing system, a second ambient condition reading from the remote sensor; and
    operate the HVAC unit based on the second ambient condition reading.

12. A heating, ventilation, and air conditioning (HVAC) system, comprising:
    an HVAC unit configured to adjust an ambient condition within a building;
    a return air sensor;
    a remote sensor disposed within the building, wherein the remote sensor is separate from a thermostat within the building; and
    a controller communicatively coupled to the return air sensor and the remote sensor, wherein the controller comprises instructions that, when executed by a processing system, cause the processing system to:
    transmit a signal to the remote sensor;
    in response to an absence of a return signal from the remote sensor and in response to a first determination that the HVAC unit is in an off cycle for a first predetermined amount of time, operate the HVAC unit to circulate air within the building;
    receive an ambient condition reading from the return air sensor subsequent to operation of the HVAC unit to circulate the air within the building;
    compare the ambient condition reading to an ambient condition setting; and
    in response to a second determination that the ambient condition reading is not within a threshold amount of the ambient condition setting, operate the HVAC unit to provide heating or cooling.

13. The HVAC system of claim 12, wherein the controller is configured to disable heating or cooling operation of the HVAC unit in response to a third determination that the ambient condition reading is within the threshold amount of the ambient condition setting.

14. The HVAC system of claim 12, wherein the controller is configured to transmit the signal to the remote sensor in response to a third determination that a network associated with the remote sensor is available.

15. The HVAC system of claim 14, wherein the controller is configured to:
   detect whether the network associated with the remote sensor is unavailable; and
   in response to a fourth determination that the network is unavailable, operate the HVAC unit based on the ambient condition reading received from the return air sensor.

16. The HVAC system of claim 12, wherein the controller is configured to operate a blower of the HVAC unit for a second predetermined period of time or a predetermined number of cycles to circulate the air within the building.

17. The HVAC system of claim 12, wherein the controller is configured to output a warning indicative of communication loss with the remote sensor in response to the absence of the return signal from the remote sensor.

18. The HVAC system of claim 12, wherein the controller is configured to output a warning in response to a third determination that the return signal is not received after a second predetermined amount of time.

19. A non-transitory computer-readable medium storing instructions that, when executed by a processing system, cause the processing system to:
   determine whether a network configured to communicatively couple an HVAC unit to a remote sensor is available, wherein the remote sensor is independent of a thermostat; and
   in response to a first determination that the network is unavailable:
      receive a temperature reading from a return air sensor associated with the HVAC unit, wherein the temperature reading is indicative of a first temperature associated with air inside of the HVAC unit;
      receive an outside temperature reading, wherein the outside temperature reading is indicative of a second temperature associated with air outside of the HVAC unit;
      offset the temperature reading from the return air sensor based on the outside temperature reading to provide an offset temperature reading;
      compare the offset temperature reading to a temperature setting, wherein the temperature setting is stored in a memory associated with the processing system; and
      in response to a second determination that the offset temperature reading is not within a threshold amount of the temperature setting, operate the HVAC unit based on the offset temperature reading.

20. The non-transitory computer-readable medium of claim 19, wherein in response to the second determination that the offset temperature reading is not within the threshold amount of the temperature setting, the processing system is configured to operate the HVAC unit to provide heating or cooling until the offset temperature reading is within the threshold amount of the temperature setting, and wherein the processing system is configured to suspend operation of the HVAC unit in response to a third determination that the offset temperature reading is within the threshold amount of the temperature setting.

* * * * *